United States Patent [19]
Kipple et al.

[11] Patent Number: 5,227,982
[45] Date of Patent: Jul. 13, 1993

[54] DIGITAL REVERBERATION TIME MEASUREMENT SYSTEM

[75] Inventors: Blair M. Kipple, Bremerton, Wash.; Douglas A. Noll, Rockville, Md.; Andrew H. Chiang, Somerville, Mass.

[73] Assignee: The United States of America as represented by the Secretary of the Navy, Washington, D.C.

[21] Appl. No.: 661,932

[22] Filed: Feb. 28, 1991

[51] Int. Cl.$^5$ .......................... G01H 7/00; G06F 15/20
[52] U.S. Cl. ...................... 364/508; 73/579; 364/480
[58] Field of Search ............... 364/508, 480, 481; 73/579, 586

[56] References Cited

U.S. PATENT DOCUMENTS

| | | | |
|---|---|---|---|
| 4,272,990 | 6/1981 | Hiemann et al. | 73/586 |
| 4,535,629 | 8/1985 | Prine | 364/508 X |
| 4,733,361 | 3/1988 | Krieser et al. | 364/508 |
| 4,821,205 | 4/1989 | Schutten et al. | 364/508 |
| 4,931,949 | 6/1990 | Hernandez et al. | 364/508 X |
| 4,979,125 | 12/1990 | Kwun et al. | 364/508 X |
| 4,988,979 | 1/1991 | Sasaki et al. | 364/508 X |
| 5,016,185 | 5/1991 | Kuester et al. | 364/481 |

OTHER PUBLICATIONS

Plunkett, R., "Measurement of Damping," ed. Ruzicka, J. E., *Structural Damping: ASME Annual Meeting*, sec. 5, pp. 117–131, Atlantic City, N.J., ASME, New York, Dec. 1959.
Smith, P. W., and Lyon, R. H., "Sound and Structural Vibration," NASA *Contractor Report*, NASA CR-160, pp. 11–24, Washington, Mar. 1965 109–115.
Bradley, J. S., and Halliwell, R. E., "Making Auditorium Acoustics More Quantitative," *Sound and Vibration*, pp. 16–23, Feb. 1989.
Scheinberg, S. P., and Dear, T. A., "Architectural Acoustics in Silo-Shaped Rooms," *Sound and Vibration*, pp. 22–25, Jul. 1989.
Rosen, J., "Shaping the Sound of Concert Halls," *Mechanical Engineering*, pp. 48–55, Aug. 1986.
Rogers, L., "Damping as a Design Parameter," *Mechanical Engineering*, pp. 66–69, Jan. 1986.
Drake, M. L., "Passive Damping: Has Its Time Finally Come?," *Mechanical Engineering*, pp. 20–24, Dec. 1985.
"The Complete Acoustics Laboratory"; Brüel & Kjaer; pp. 1–8.
Brüel & Kjaer Application Notes: "Measurement of Reverberation Time with the Single/Dual Channel Real-Time Analyzer 2123/33"; K. Hojbjerg; (1990); pp. 1–4.

*Primary Examiner*—Kevin J. Teska
*Attorney, Agent, or Firm*—Howard Kaiser

[57] ABSTRACT

Apparatus and method, having both structural and acoustical applicability, for measuring damping of a solid or fluid resonant physical system in terms of reverberation or decay time, featuring a digital computer-based measurement system in which plural numbers of resonances are grouped into single analysis bands. The resonant response is converted into an electronic signal, which is then pre-amplified, filtered, post-amplified, digitized and finally processed so as to determine the reverberation time in the resonant physical system.

2 Claims, 6 Drawing Sheets

UNCLIPPED

FIG. 10

CLIPPED

FIG. 11

DIGITAL REVERBERATION TIME MEASUREMENT SYSTEM

The invention described herein may be manufactured and used by or for the Government of the United States of America for governmental purposes without the payment of any royalties thereon or therefor.

BACKGROUND OF THE INVENTION

The present invention relates to resonant physical systems, more particularly the measurement of the decay times of lightly damped resonant systems and hence the characterization of the damping thereof.

The measurement of the damping of a physical system is often essential in an acoustical experiment or evaluation. Two prime examples are evaluation of the damping present in a structure or characterization of the reverberance of a room.

Other damping measurement methods have required many man-hours to define the damping of a single structure. These techniques typically require the measurement of the loss factor of each individual resonance peak of the structure. A typical structure would exhibit many such resonance peaks, thus multiplying the effort required for the measurement. Additionally, for structures with high mode densities, or for frequency regimes where modes are closely spaced, it is not possible to accurately determine structural damping using these techniques.

One apparatus previously used by the U.S. Navy for this type of measurement was constructed using analog electronics technology and components. Although it utilized vibration decay theory, as does the present invention, the prior device was found to be unduly sensitive to normal handling by operators and quickly became unreliable in operation. Also, the apparatus was difficult and costly to repair and trained personnel for repairing the apparatus were not available. Additionally, many of the components used to construct the device were obsolete and no longer available.

For an excellent discussion of the theoretical approaches underlying various damping measurement methods, see Plunkett, R., "Measurement of Damping," ed. Ruzicka, J. E., *Structural Damping: ASME Annual Meeting*, sec. 5, pp. 117–131, December 1959, Atlantic City, NJ, ASME, New York (1959); Smith, P. W., and Lyon, R. H., "Sound and Structural Vibration," NASA Contractor Report, NASA CR-160 (March 1965). A brief description of the theory underlying the present invention follows.

The damping of a lightly damped physical system (e.g. steel beam, sheet metal panel, reverberant room such as gymnasium, etc.) may be quantified using the parameters of loss factor (for a structure) or room constant (for a room). For convenience and simplicity this description will only include one of these parameters, viz., the loss factor.

If a resonant structure is excited and its transient response is measured, it may be shown that the loss factor of the resonance of interest is proportional to the time required for the amplitude of vibration to be reduced to 1/1000-th (or −60 dB) of its initial value. This time is called the 60 dB decay time, or 60 dB reverberation time. The theoretical background for the loss factor and the reverberation time for a simple harmonic oscillator is given below. The following discussion will also develop an equation relating the slope of the decay envelope function to the loss factor, since the measurement system algorithm uses this slope to calculate the loss factor.

Referring to any basic vibration text, consider the free response of a simple linear vibrating system such as the simple harmonic oscillator consisting of a mass, spring and damper. Let the applied force F be zero to determine the free oscillatory behavior of the oscillator.

The force applied to the mass by the spring is proportional to the displacement x (Hooke's Law) and is given by $$f_s = -sx \qquad (1)$$

where s is the spring constant.

If the force applied to the mass due to the damper is proportional to the velocity dx/dt, it is given by $$f_d = -c\frac{dx}{dt} \qquad (2)$$

where c is the damping coefficient.

Taking the resonance frequency $\omega_o^2 = s/m$ $$f_s = -m\omega_o^2 x \qquad (3)$$

Also the loss factor $\eta$ may be defined in terms of the damping coefficient $$\eta = \frac{c}{m\omega_o} \qquad (4)$$

so that $$f_d = -\eta m\omega_o \frac{dx}{dt} \qquad (5)$$

Recalling F is zero, the equation of motion of the oscillator is thus given by $$m\frac{d^2x}{dt^2} = F + f_s + f_d \qquad (6)$$

$$m\frac{d^2x}{dt^2} + \eta m\omega_o \frac{dx}{dt} + m\omega_o^2 x = 0 \qquad (7)$$

Assuming a complex solution (∼ denotes a complex quantity) to equation (7) of the form $$\tilde{x} = \tilde{A} e^{rt} \qquad (8)$$

and substituting into Eq. (7) it is determined that $$r_1, r_2 = -\frac{\eta \omega_o}{2} \pm \left[ \left( \frac{\eta \omega_o}{2} \right)^2 - \omega_o^2 \right]^{\frac{1}{2}} \qquad (9)$$

Considering the case of lightly damped structures (and thus oscillatory motion), where $\omega_o^2 > (\eta \omega_o/2)^2$, then $r_1$ and $r_2$ are complex numbers.

Now the general solution is given by $$\tilde{x} = e^{-(\eta/2)\omega_o t}(\tilde{A}_1 e^{j\omega_d t} + \tilde{A}_2 e^{j\omega_d t}) \qquad (10)$$

where $\omega_d$ is the damped natural frequency $$\omega_d = \omega_o \sqrt{1 - \left(\frac{\eta}{2}\right)^2} \quad (11)$$

or in terms of the damping ratio $\xi$ defined by $$\xi = \frac{c}{c_c} = \frac{\eta}{2} \quad (12)$$

where $c_c$ is the critical damping constant and $$\omega_d = \omega_o \sqrt{1 - \xi^2} \quad (13)$$

However, even if $\eta$ were as high as 0.5 (which is seldom true for the structures of interest) the damped natural frequency as calculated by Eq. (11) yields $\omega_d = 0.97\omega_o$. Thus, in this analysis let $\omega_d \cong \omega_o$.

The displacement is the real part of Eq. (10) and is given by $$x(t) = X_o e^{-(\eta/2)\omega_o t}\cos(\omega_o t + \phi) \quad (14)$$

where $X_o$ and $\phi$ are real constants determined by the initial conditions. This displacement function represents the free decay of the simple harmonic oscillator. Note that the oscillating part of the solution is modulated by the exponential decay part of the solution.

In determining the loss factor $\eta$, the interest lies in the envelope of the decay function since this a direct measurement of the loss factor. This envelope is represented in Eq. (14) by the decay term. Thus the envelope function is given by $$x_e(t) = X_o e^{-(\eta/2)\omega_o t} \quad (15)$$

An expression for the loss factor may be derived by taking the logarithm (base 10) of the ratio of the decay function, Eq. (15), at two points in time.

$$\log \frac{X_e(t_2)}{X_e(t_1)} = \log e^{-\eta \pi f_o(t_2 - t_1)} \quad (16)$$

where $f_o = \omega_o/2\pi$. Solving for $\eta$ gives $$\eta = \log \frac{X_e(t_1)}{X_e(t_2)} \frac{1}{\pi f_o(t_2 - t_1)\log e} \quad (17)$$

Now define a 60 dB decay time constant $\tau_{60}$ as the time required for the amplitude of vibration to decay to 1/1000th of some initial value so that $$\tau_{60} = t_2 - t_1 \text{ when } \frac{X_e(t_1)}{X_e(t_2)} = 1000.$$

The loss factor is now represented as $$\eta = \frac{1}{(.455)\tau_{60} f_o} \quad (18)$$

One means of measuring the loss factor is to represent the response of the oscillator in Eq. (14) in such a manner that a measurable linear slope may be matched to the natural decay envelope of the function.

Taking the absolute value of Eq. (14) the result is $$|x(t)| = |X_o e^{-(\eta/2)\omega_o t} \cos(\omega_o t + \phi)| \quad (19)$$

which makes all values positive. By taking the log (base 10) of Eq. (19) the exponential decay appears linear on a log plot.

$$\log |x(t)| = \log |X_o e^{-(\eta/2)\omega_o t}| + \log |\cos(\omega_o t + \phi)| \quad (20)$$

Taking only the maxima of the oscillatory part (i.e., $\cos(\omega_o t + \phi) = 1$) and dropping the absolute value signs, the envelope function is given by $$\log x_e(t) = \log X_o e^{-(\eta/2)\omega_o t} \quad (21)$$

Now define the slope m of the envelope function in terms of $t_1$ and $t_2$ $$m = \frac{\log x_e(t_1) - \log x_e(t_2)}{t_1 - t_2} = \log \frac{x_e(t_1)}{x_e(t_2)} \frac{1}{t_1 - t_2} \quad (22)$$

Hence Eq. (17) may be written in terms of m $$\eta = (-m)\frac{1}{\pi f_o \log e} \quad (23)$$

Thus the loss factor at the resonance frequency $f_o$ may be calculated by determining the slope of the logarithm of the envelope function.

Note that the loss factor is calculated for a specific frequency $f_O$. In this case of a single resonance (i.e. simple harmonic oscillator) this frequency is merely the resonance frequency of the oscillator. However, for the case of a more complicated system such as a beam or structure, many resonances occur over a broad frequency range.

The damping for this type of structure may be determined by either of two approaches: Each resonance may be individually isolated and its loss factor measured; alternatively, the loss factor for a group of resonances clustered into a given frequency band may be determined. In the latter case the loss factor of the least damped resonance peak in the band or the loss factor of the most dominant peak in the band is measured and taken to represent the loss factor for the resonances included in the band. This latter technique is useful for acoustic studies and evaluations. The former technique is more laborious and time consuming, since each resonance is individually considered. Also, the results are typically no more useful than those determined by the frequency band approach. Traditionally, structural damping has been evaluated by measuring the half-power bandwidth of a resonance in accordance with the former approach, as discussed by Plunkett. Another accepted method of determining structural damping, in accordance with the latter approach and as discussed by Smith and Lyon, involves measuring the time rate of decay of the structural impulse response in a frequency band containing the resonance of interest.

SUMMARY OF THE INVENTION

The damping measurement system of the present invention is based upon the latter method.

The present invention provides a method for measuring reverberation time in a resonant physical system, comprising converting the resonant response of the resonant physical system into an electrical signal, amplifying the electronic signal a first time, filtering the electronic signal, amplifying the electronic signal a second time, digitizing the electronic signal, and processing the electronic signal into data. For various other embodiments of the present invention resonant response conversion, electronic signal pre-amplification, electronic signal filtering, and/or electronic signal post-amplification can be eliminated.

This invention provides an instrumentation system which takes a digitized electronic signal representing the free decay of an oscillatory system, Eq. (14), and digitally performs the operations of Eqs. (19) and (20) so that the slope of the decay function, and hence the loss factor, can be determined. In structural damping applications an accelerometer would typically be mounted to the structure of interest and would provide an analog representation of the decay function. Representing the response in terms of acceleration instead of displacement does not cause difficulties since the terms resulting from the differentiation cancel in Eq. (17). The acceleration signal is then filtered in a one-third octave band containing the resonance frequency of interest. Since a typical structure exhibits resonance at many frequencies, this limits the loss factor determination to individual one-third octave bands. It is noted that, although the system described herein measures the loss factor (e.g., of structures) using $\frac{1}{3}$ octave band pass filter, any band pass filter suitable for the user's needs may be substituted. Next the signal is digitized and transferred to a processor (e.g., desktop computer) where the absolute value and logarithm of each data point are taken. This new function is then displayed and a processor-generated slope is matched to the decay function to determine the slope m and calculate the loss factor using Eq. (23). Typically, the loss factor of the structure will be determined over many one-third octave bands (each containing at least one resonance) and then will be plotted versus frequency (one-third octave band frequency).

FEATURES AND ADVANTAGES

The present invention provides a method which could potentially be applied to any type of measurement situation wherein characterization of the decay of a linear system's response is desired. One application of this invention involves the measurement of reverberation time as it is applied to architectural acoustics and the acoustic characteristics of enclosed spaces. Another application pertains to the measurement of reverberation time to quantify the damping properties of mechanical systems.

In the design and evaluation of interior spaces of buildings, wherein the acoustics of the spaces is an important consideration, and in acoustic research work, reverberation time is the principal means of quantifying the reverberance or "liveliness" of an enclosed space. The method for measuring reverberation time which is provided by the present invention is indeed a valuable asset in the design of building spaces such as office spaces, shop spaces, concert halls, sanctuaries and auditoria.

Increased attention to reduction of noise associated with business, industrial, military and household equipment has led to widespread interest in damping of structural components and in the properties of associated damping materials. The present invention was developed specifically to measure the decay constant (i.e., reverberation time) associated with the transient response of damped structures. It is ideally suited for measuring the damping of a structure and for evaluating the effectiveness of a damping treatment that has been applied to a structure. The digital reverberation time measurement system of this invention is capable of measuring the short reverberation times typically encountered when conducting damping measurements. Commercially available instruments are frequently incapable of measuring such short reverberation times.

Rather than determining the loss factor of individual resonances using frequency analysis techniques requiring long processing and sample times for entities containing many resonances, the present invention features the grouping of a number of resonances into a single analysis band—thereby permitting measurement of the damping using time domain techniques which require much shorter processing time; hence, loss factor measurement in accordance with this invention is less tedious and more expedient to conduct when compared with other loss factor measurement methods.

The present invention additionally features a digital computer-based measurement system. By automating some of the labor-intensive aspects of the measurement, it allows for increased efficiency in loss factor measurement, in terms of time, cost and reliability, over the formerly used analog system and other methods. Data files are easily stored and recalled using this invention's system. Tabulation, processing and storage of the data, for example, are accomplished by the computer. The capability of this invention to document the measurement through data and hardcopy outputs is indeed advantageous. Moreover, operator error is reduced, since the computer controls the measurement sequence and provides a hardcopy of the results. Automatic computer control renders the present invention not only less prone to operator error but faster to use and much more reliable in both field and laboratory use than the previously used analog system and other methods. The autofitting routine that provides a computer-fitted slope to the decay function also reduces measurement time and increases operator efficiency.

Experience gained by conducting damping measurements with both the present invention's digital RTM system and the analog RTM system has revealed many of the attendant advantages of the present invention. For example, typical damping measurements have been easily conducted with greater efficiency when using the digital system versus the analog system. A typical loss factor measurement run for a beam or plate damping measurement in the frequency range of approximately 1 kHz to 20 kHz frequently requires about 50 percent less time to complete using this invention's digital system. When the time required for data compilation and plotting using the analog system is included, the time savings can become greater since the digital system performs these functions automatically. It has been observed that operator errors are reduced through the automation of tedious and/or labor-intensive aspects of the measurement process, such as manual selection of $\frac{1}{3}$ octave band center frequencies, manual data entry into a computer for processing and plotting, or calculation and plotting of loss factors by hand.

Economic and practical advantages derive, as well, from the relatively non-extraordinary nature of the system components of the present invention. All equipment used in the system of the present invention is of commercial manufacture and thus easily serviceable by the manufacturer; each component is an off-the-shelf item that is readily repairable by the manufacturer.

Furthermore, funding need not be completely directed to a single instrument which is useful solely for one type of measurement; rather, these funds may be used to procure several versatile instruments, each of which is useful for a variety of measurement tasks. On the other hand, all of the instruments lend themselves to being combined into a single dedicated package that would perform only the loss factor measurement function. This would simplify operation of the system and make the system more compact.

Other advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
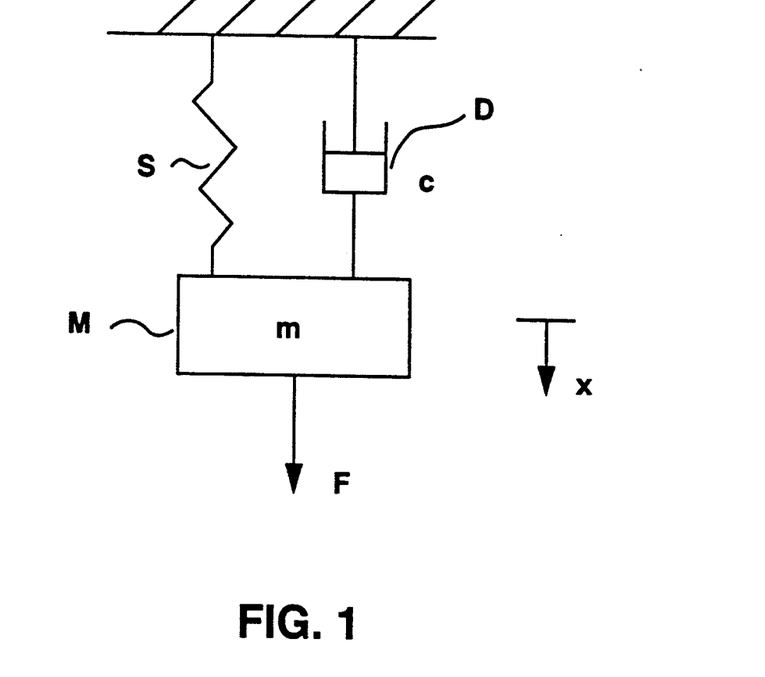
FIG. 1 is diagram of a simple harmonic oscillator.
Figure 2:
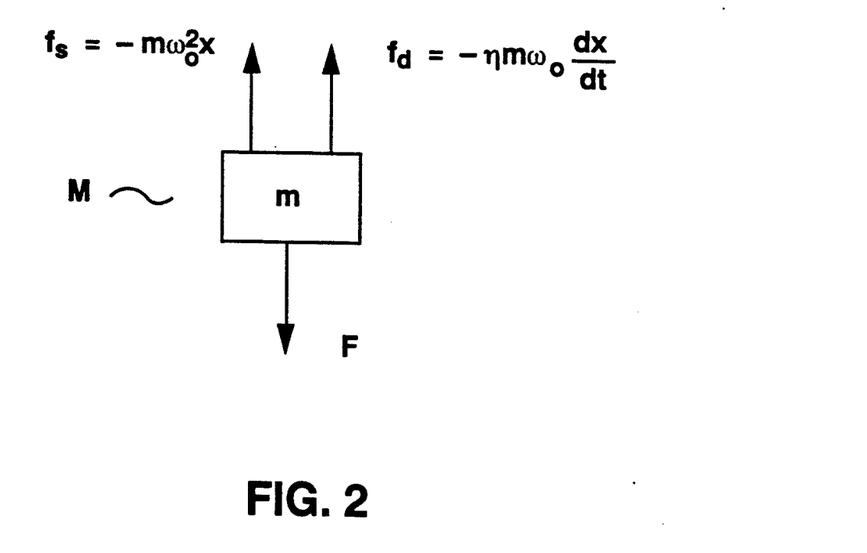
FIG. 2 is a diagram similar to FIG. 1, illustrating the forces given by Eq. (3) and Eq. (5).

Reference now being made to FIG. 1, a simple harmonic oscillator is a simple linear vibrating system which consists of mass M having mass m and oscillating distance x, spring S, damper D having damping coefficient c, and applied force F to mass M. With reference to FIG. 2, applied force F is zero in order to determine the free oscillatory behavior of the oscillator. Force $f_s$ is the force applied to mass M by spring S, and is given by Eq. (3). Force $f_d$ is the force applied to mass M due to damper D, and is given by Eq. (5).

Figure 3:
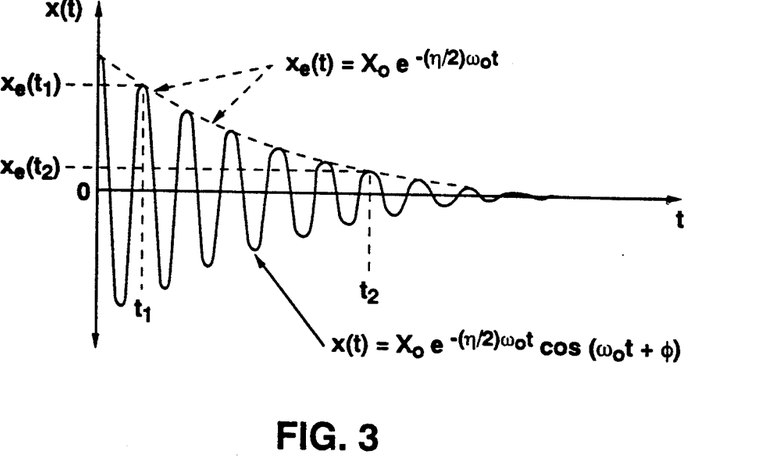
FIG. 3 is a graph showing the displacement function given by Eq. (14) and the envelope function given by Eq. (15).
Figure 4:
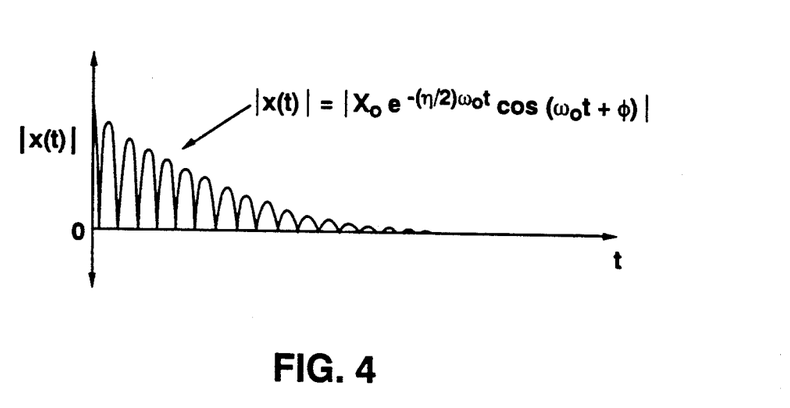
FIG. 4 is a graph showing the absolute value function given by Eq. (19), taking the absolute value of the decay displacement function given by Eq. (14).
Figure 5:
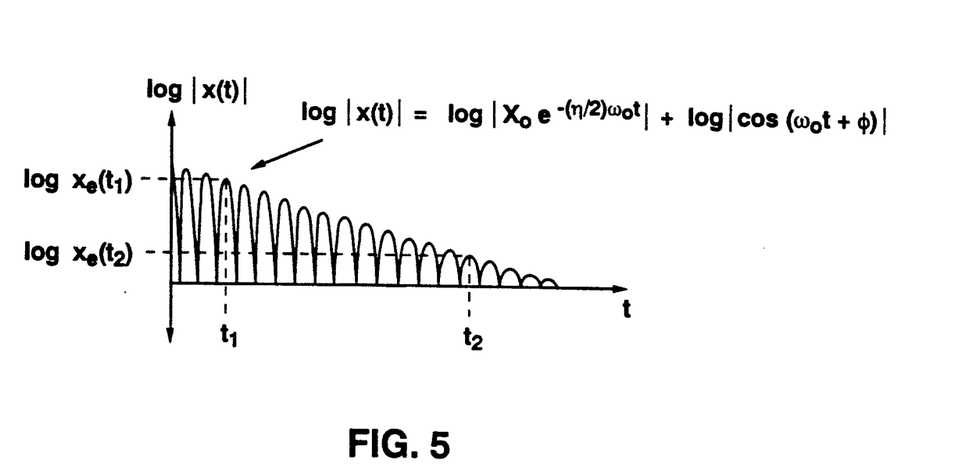
FIG. 5 is a graph showing the logarithm function given by Eq. (20), taking the base ten logarithm of the absolute value function given by Eq. (19).

The response of the damped oscillator is shown in FIG. 3, wherein the displacement (decay) function given by Eq. (14) and the envelope function given by Eq. (15) are plotted. A measurable linear slope is matched to the envelope function given by Eq. (15), in order to measure the loss factor. Referring to FIG. 4 and FIG. 5, Eq. (19) and Eq. (20), respectively, are plotted. In FIG. 4, Eq. (19) takes the absolute value of Eq. (14). In FIG. 5, Eq. (20) takes the log (base 10) of Eq. (19). It is noted that when the cosine term in Eq. (20) is equal to zero, the log of the cosine is undefined; however, the cosine term is retained here to show how the measurment system of the present invention processes and displays the decay waveform data. It is also noted that the measurement system algorithm which is utilized in accordance with the present invention screens out zero-valued data points in order to avoid log function errors.

Figure 6:
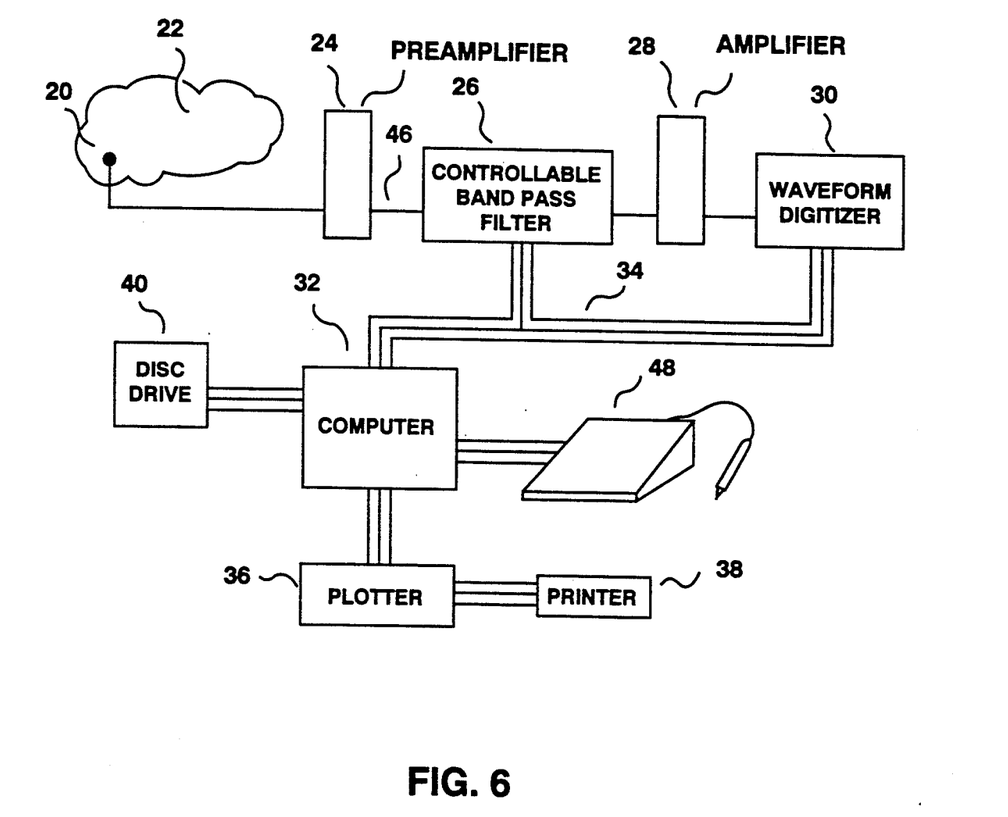
FIG. 6 is a schematic diagram of the digital reverberation time measurement system provided by the present invention.

Referring now to FIG. 6, accelerometer 20 mounted on structure 22 acts as a vibration transducer and converts the decaying structural vibration into an electronic signal. This signal is amplified by pre-amplifier 24 and routed to controllable band-pass filter 26. Next the signal is amplified by post-amplifier 28. Then the analog signal is digitized by waveform digitizer 30. Once digitized, the signal may be represented as a listing of numbers in a file. This digital file is then transferred to computer 32 for processing and display via computer interface 34.

In accordance with theory heretofore discussed herein, the absolute value of all data points in the file is determined and then the logarithm (base 10) of each point is calculated. The resulting data file is then plotted on the computer 32 display screen.

Figure 7:
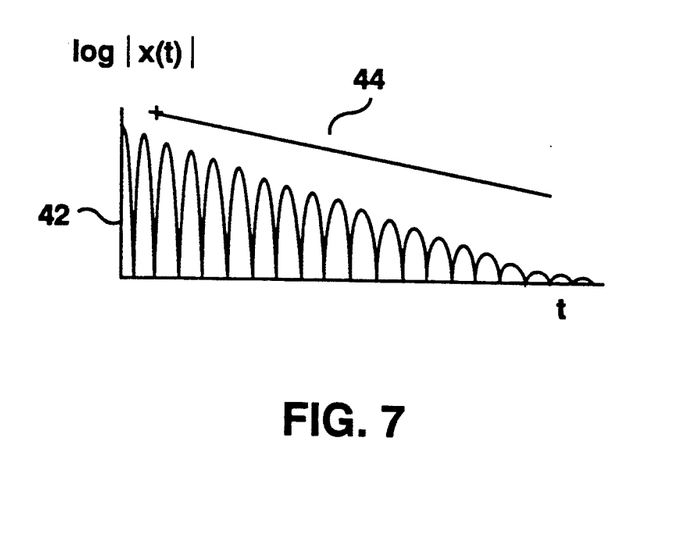
FIG. 7 is a graph similar to FIG. 5, showing a decay data function and a slope-matching line wherein the slopes are unmatched.
Figure 8:
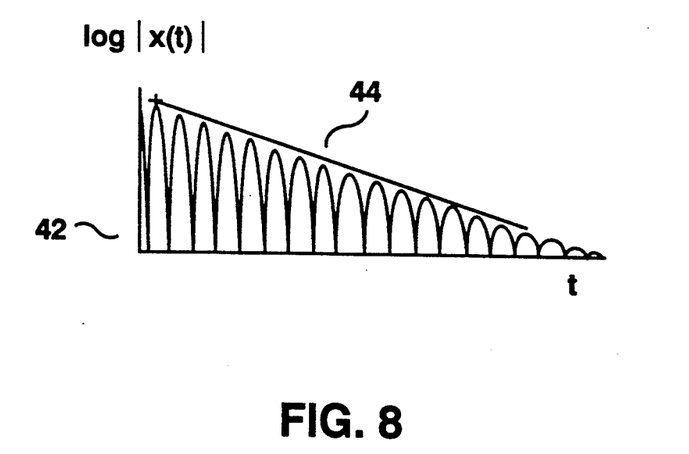
FIG. 8 is a graph similar to FIG. 5, showing a decay data function and a slope-matching line wherein the slopes are matched.

When the data file is displayed it resembles the plot shown in FIG. 5. Reference now being made to FIG. 7 and FIG. 8, not only is decay data function 42 displayed, but computer-generated line 44 also appears on the screen. The slope of line 44 is controlled by the operator in order to determine the loss factor of the structure.

Plotter 36, printer 38, and disc drive 40 are also interfaced to computer 32 to provide hardcopy and magnetic storage of the data.

The digital reverberation time measurement system described herein is operated mainly from the computer keyboard and most system operation functions are computer-controlled. First structure 22 is excited into vibration either by an impulsive or steady state (but oscillatory) force. This means of excitation must excite all vibration modes of interest.

Once the operator determines which frequency bands he will use to measure the structural loss factor, he is ready to begin using this invention's digital reverberation time measurement system. First, the operator enters into computer 32 the band pass filter 26 numbers which will be utilized by the system for the measurement. Next, computer 32 automatically sets the first band which will be used by remotely selecting the band number of band pass filter 26 via interface 34. Finally, the operator sets the amplifier gains for pre-amplifier 24 and post-amplifier 28 and the waveform digitizer 30 range for optimal signal-to-noise ratio for the measurement.

At this point, the system is set up and ready to collect data. The operator excites structure 22 with an impulse (e.g., impact hammer) or with a steady state excitation source (e.g., shaker) which is then switched off to obtain the transient response. The decaying structural vibration is converted into an analog electronic signal by accelerometer 20. With regard to this conversion, it is noted that accelerometer 20 or any other typical vibration measurement transducer can be employed, in accordance with the present invention, for converting the resonant response of the resonant physical system into an electrical signal. For different embodiments of this invention, the vibration transducer can be of the displacement, velocity or acceleration type.

The resulting filtered decay signal is digitized by waveform digitizer 30 and transferred to computer 32 upon the operator's request. Next, with reference to FIG. 7, computer 32 automatically processes the data in accordance with theory previously discussed herein, and displays the resulting decay function 42 on the computer 32 display along with operator-adjustable slope-matching line 44.

At this point the operator may choose to let computer 32 fit slope-matching line 44 to the decay function 42 data, or the operator may fit slope-matching line 44 manually via control from the computer 32 keyboard. Referring to FIG. 8, the automatic fitting routine of computer 32 picks points on the decay function 42 data trace and draws a matching line 44 whose slope matches that of the chosen points of decay function 42. The manual fitting capability is provided for cases when the automatic fitter does not generate a satisfactory slope match. Typically the auto fitting routine will provide acceptable slope matches for data traces with more "ideal" shapes resembling decay function 42 shown in FIG. 5. For other decay function 42 data traces with more complicated shapes (perhaps due to poor signal-to-noise ratio or interference between adjacent modes), the operator should adjust the line 44 slope manually until the line 44 slope visually matches the decay function 42 data slope, as shown in FIG. 8. The loss factor and reverberation time that correspond to the display line 44 slope are continually shown on the computer 32 screen in real time as the line 44 slope is adjusted.

Once the operator determines that a satisfactory match has been achieved he instructs computer 32 to accept the measurement. Computer 32 then stores the loss factor value and the band pass filter frequency and automatically sets up the band pass filter for the next measurement.

When all of the measurements have been completed (i.e. a measurement has been conducted for each preselected band pass filter number), computer 32 will print out the results on printer 38 or make a data plot on plotter 36 upon command. Additionally, the measurement results are stored on a computer disc via disc drive 40 for later reference.

EXAMPLE 1

The digital equipment-based reverberation time measurement system of the present invention was developed by the Department of the Navy at the David Taylor Research Center. The system utilized a Hewlett-Packard (HP) 9826/9836/9000-300 series desktop computer as a processor/instrument controller, a Tektronix (TEK) 2430 or 468 digitizing oscilloscope as a waveform digitizer, a Bruel and Kjaer (B & K) 1617 band pass filter as a controllable ⅓ octave filter, and BASIC language computer programs. The accelerometer which was used was dependent upon the structure to be measured. Two signal amplifiers were compatible with the used accelerometer. The Tektronix digital storage oscilloscope had an IEEE-488 interface bus option. Also utilized were a Hewlett-Packard 9111A graphics tablet (digitizer), Hewlett-Packard 7475A digital plotter, HP-IB interface cables, Bruel and Kjaer cable AO 0264 interface cable, Bruel and Kjaier IEEE 24 way connector to IEC 25 way connector, BNC cables, spectrum analyzer (to determine location of modes), and a line printer. The line printer was optional. Any compatible plotter could have been used instead of the Hewlett-Packard 7475A.

It is noted that Hewlett-Packard computers 9826 and 9836 and other computers are outfitted with keyboards that have arrow keys and a knob. These keyboard devices can be used, instead of the HP 9111A graphics tablet, to control the cursor location in the slope-fitting routine of the digital RTM programs. A computer with this capability is attractive as an RTM unit for field measurements. Peripherals such as a knob or mouse are available for computers having no knob included on the standard keyboard.

The RTM programs utilized the analog-to-digital conversion capabilities of either the TEK model 468 or model 2430 oscilloscopes to convert acceleration voltages into data arrays that may be post-processed in a computer. A separate program was written in HP BASIC 3.0 for each oscilloscope model. It is noted that the programs will run successfully only if the computer has HP BASIC 3.0 for each oscilloscope model.

Referring again to FIG. 6, HP-IB cable interface 34 connections are symbolized by three lines and BNC cable 46 connections are denoted by a single line. Communicating via HP-IB interface 34, HP computer 32 retrieves a digitized acceleration versus time waveform which has been filtered in a particular one-third octave band by a B & K type 1617 band pass filter 26, which is automatically controlled by HP computer 32 over HP-IB interface 34. Next HP computer 32 takes the absolute value and logarithm of the acceleration record to calculate and display the decay function of FIG. 5. Using HP 9111A digitizing graphics tablet 48, the operator "draws" line 44 on the HP computer 32 screen and matches the decay function 42 data with his best estimate of the slope. This matching requires a degree of skill and experience, in order to interpret the correct slope of the decay function 42 data. From the matched slope drawn by the user, HP computer 32 then calculates the 60 dB decay time and the loss factor for that particular one-third octave band. This process may be repeated for other one-third octave bands which contain resonance frequencies. When all of the desired data have been taken, the user has the options to store the data on disc via disc drive 40, print out a table of the measured loss factor and frequencies via printer 38, and generate a 3×3 cycle log/log plot of the measured loss factor versus frequency via plotter 36.

Program 2430 RTM utilizes TEK 2430 digital storage oscilloscope 30 to convert the analog acceleration voltage to digital data that can be post-processed in HP computer 32. Before the data are transferred, oscilloscope 30 is in local (front panel) operating mode. Thus, the user may observe individual members of an ensemble of acceleration decay signals resulting from a number of mechanical impacts (structural excitations) upon the specimen before selecting the decaying acceleration waveform that will be sent to computer 32 for processing. In this manner one may easily screen out unsuitable waveforms. Program 468 RTM utilizes the TEK 468 oscilloscope to convert analog acceleration voltages to digital data. Computer 32 follows essentially the same procedure for program 468 RTM as for program 2430 RTM; however, for program 468 RTM the scaling parameters are included at the beginning of the data array as numerical values called a "header".

Another feature of both programs is automated control of digital ⅓ octave band pass filter 26. Remote control of band pass filter 26 is desirable since the possibility of user error in setting the correct ⅓ octave center frequency on the band pass filter is eliminated. At the beginning of the program, computer 32 prints out on the screen a list of the ⅓ octave center frequencies which correspond to band numbers 3 to 46. After the list has been printed, computer 32 asks the user which bands should be skipped (or, which bands do not contain resonance frequencies of structure 22), since loss factor determination is valid only in ⅓ octave bands which contain resonance peaks. The band numbers to be skipped are retained in an array. At the start of the measurement process for each ⅓ octave band, the band filter number is selected by using designated statements to create an output string defining the center frequency of interest. The center frequency is then stored in an array, and the frequency value is used to calculate the loss factor from the measured reverberation time in accordance with the theory previously discussed herein.

Both programs use HP 9111A graphics tablet 48 to perform the slope-matching from which reverberation times and loss factors are calculated. As previously noted, other graphics devices, such as the keyboard knob or arrow keys, may also be used to perform the slope-matching function. After data transfer between oscilloscope 30 and computer 32 is completed, computer 32 displays the processed waveform on the screen. A menu of user-programmable computer keys, or softkeys, designated for the slope-matching process, then appears at the bottom of the screen. When a designated softkey (SLOPE softkey) is pressed, computer 32 displays a slope based on a least-squares fit of the waveform data along with a second set of softkeys. This second softkey menu allows the user to take either the computer-calculated loss factor from the least-squares fit (TAKE-SLOPE softkey) or fit the data manually using the digital graphics tablet (OTHER-CURSOR softkey). The computer initially sets two cursors on the screen along with the waveform. The first cursor is fixed at the maximum value of the waveform, while the second cursor is controlled by the position of the Graphics tablet pen. Computer 32 draws a line between the two cursors, and the user controls the slope of the line by changing the position of the second cursor via graphics tablet 48. If the OTHER-CURSOR softkey is pressed again, the second cursor becomes fixed, and the user can change the position of the first cursor. This process is repeated until the user has obtained a satisfactory match between the data and the slope line as described previously. When a satisfactory match is found the slope value is recorded by pressing the TAKE-SLOPE softkey. Computer 32 calculates the 60 dB reverberation time from the position of the two cursors, and the loss factor is found from the reverberation time and center frequency in accordance with the theory previously discussed herein.

It is noted that any embodiment of the present invention will have a useable measurement range, inasmuch as the performance of any measurement system is limited by its instrumentational composition. One must determine these limitations and be aware of them throughout the measurement process. The frequency range over which loss factor measurements may be conducted is limited by the instrumentation. The range over which the loss factor of a structure may be accurately measured is also affected by the instrumentation used in the measurement system.

In this example of the present invention B and K 1617 band-pass filter 26 synthesizes standard one-third octave filters from 2 Hz to 160 kHz. Either TEK 468 digital oscilloscope 30 or TEK 2430 digital oscilloscope 30 has a minimum frequency range of DC to 10 MHz in the digital storage mode. Given these specifications, the measurement range will usually be limited by the accelerometer and amplifier that are used for the measurement, since the frequency response of an accelerometer is limited well below 100 kHz; i.e., the frequency response of the accelerometer is not flat over all frequencies). The means of exciting the structure may also limit the frequency range of the measurement since it is usually difficult to excite a structure at high frequencies, especially when using impact excitation. Also, note that the lower bound of the frequency range is determined by the lowest resonance frequency of the structure.

Figure 9:
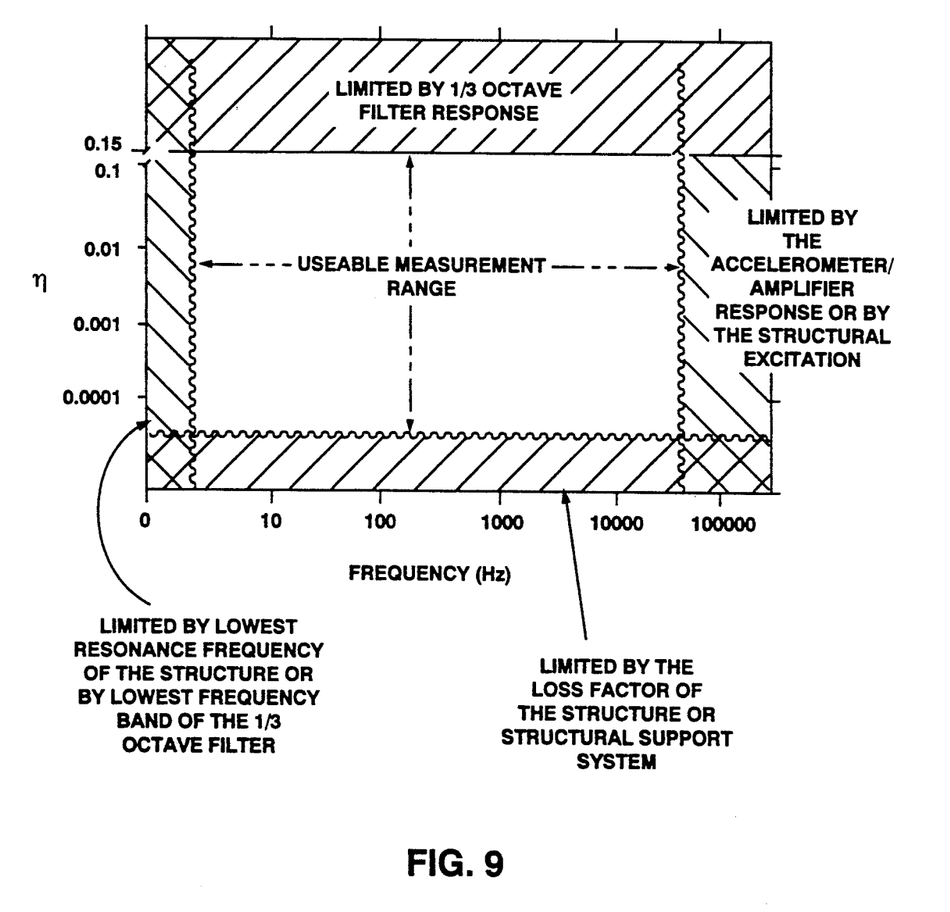
FIG. 9 is a diagram illustrating the useable measurement range of one embodiment of the present invention.

The upper limit of the loss factor measurement range is controlled by the response time of the one-third octave filter. Since the loss factor for a standard one-third octave filter is 0.15, loss factors greater than 0.15 cannot be measured with the system in this example. The lower bound of the loss factor measurement range is typically determined by the principal means of energy dissipation. This energy loss could be due to factors such as inherent structural damping, damping induced by the structure's supports, radiation damping, etc,. Loss factors less than $1 \times 10^{-4}$ are rarely encountered and are still well within the measurement range of the equipment in this example. Other instrumentation specifications such as oscilloscope analog to digital conversion resolution, sample rate, and time record resolution exceed the requirements in this example for signals in the audio frequency range and for the measurement application. With reference to FIG. 9, wherein the frequency range is graphed horizontally and the loss factor range is graphed vertically so as to illustrate the useable measurement range of the present invention based on the specifications in this example, it is seen that lightly damped structures with frequencies of interest in the audio range fall well within the given range. Furthermore, it is emphasized that useable measurement ranges of both greater and lesser scope than that of this example are contemplated by the present invention for various embodiments thereof.

It is thus seen that the present invention provides a method which comprises resonance response conversion, electronic signal pre-amplification, electronic signal filtration, electronic signal post-amplification, electronic signal digitization and electronic signal processing; Example 1 details an embodiment of this method. However, it is emphasized that alternative embodiments of this invention provide methods which eliminate, in all possible combinations, one or two or three or all four of the following four steps from among the six steps provided by the aforedescribed method of this invention: resonant response conversion; electronic signal pre-amplification; electronic signal filtration; and/or, electronic signal post-amplification. In other words, the two essential components of any of the methods provide by the present invention are: electronic signal digitization; and, electronic signal processing.

With reference to Table 1, below, wherein the presence of a step in a particular method is indicated by an "X", the present invention provides sixteen methods, viz., Examples 1 through 16. Each of Examples 2 through 16 provides a method which eliminates at least one of the six steps comprised by the method described in Example 1, above. Brief discussions of Examples 2 through 16 follow. It is again noted that digitization of the electronic signal and processing of the electronic signal are present in every method provided by the present invention.

TABLE 1

| | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Res. Resp. Conversion | X | X | X | X | | | | | X | X | X | | | X | | |
| Elec. Sig. (Pre-)Amp. | X | X | | X | | X | | | X | | | | X | X | X | |
| Elec. Sig. Filtration | X | X | X | X | X | X | X | X | | | | | | | | |
| Elec. Sig. (Post-)Amp. | X | | X | | X | X | | | X | | | X | | X | X | |
| Elec. Sig. Digitiz. | X | X | X | X | X | X | X | X | X | X | X | X | X | X | X | |
| Elec. Sig. Processing | X | X | X | X | X | X | X | X | X | X | X | X | X | X | X | |

EXAMPLE 2

If sufficient signal level is present at the output of the filter, it is possible to eliminate post-amplification from the measurement system provided by the present invention; however, normal measurement practice would dictate retention of the post-amplifier.

EXAMPLES 3, 4 and 11

If a conversion device possessing output impedance sufficient to drive the other system electronics is used, it is possible to eliminate pre-amplification, or even eliminate both pre-amplification and post-amplification, from the measurement system provided by the present invention; however, normal measurement practice would retain both the pre-amplifier and the post-amplifier.

EXAMPLES 5, 6, 7, 8, 12, 13, 15 and 16

If the measurement system is used to measure the reverberation characteristics of an electronic circuit or device, conversion by a conversion device such as a transducer is not required. In this situation it is also possible that amplification by either the pre-amplifier or the post-amplifier or both amplifiers be eliminated, but normal measurement practice would dictate retaining both amplifiers.

EXAMPLES 9, 10, 11, 12, 13, 14, 15 and 16

If the resonant physical system exhibits only a single resonance, or if the resonant response of the resonance of interest is sufficiently dominant relative to any other resonances, it is possible to eliminate filtration, as by a band pass filter.

It is noted that Example 9 and Example 10 are effectively equivalent, as are Example 12 and Example 13; in such cases, amplification cannot be said to occur "pre" or "post" filtration, as there is no filtration. In this regard, Example 14 is analogous to Example 9 and Example 10, and Example 15 is analogous to Example 12 and Example 13; the distinction is that amplification is indicated to be taking place twice in Example 14 and in Example 15. In fact, amplification can take place any number of times as may be suitable in practice in accordance with this invention. In those embodiments of the present invention in which filtration does take place, it is noted in this regard that Example 2 differs from Example 3, as does Example 6 differ from Example 7, in terms of this pre-amplification (i.e., amplification occurring before filtration) versus post-amplification (i.e., amplification occurring after filtration) distinction. In Example 1 and Example 5 both pre-amplification and post-amplification are performed. Filtration can take place any number of times as may be suitable in practice in accordance with the present invention.

Figure 10:
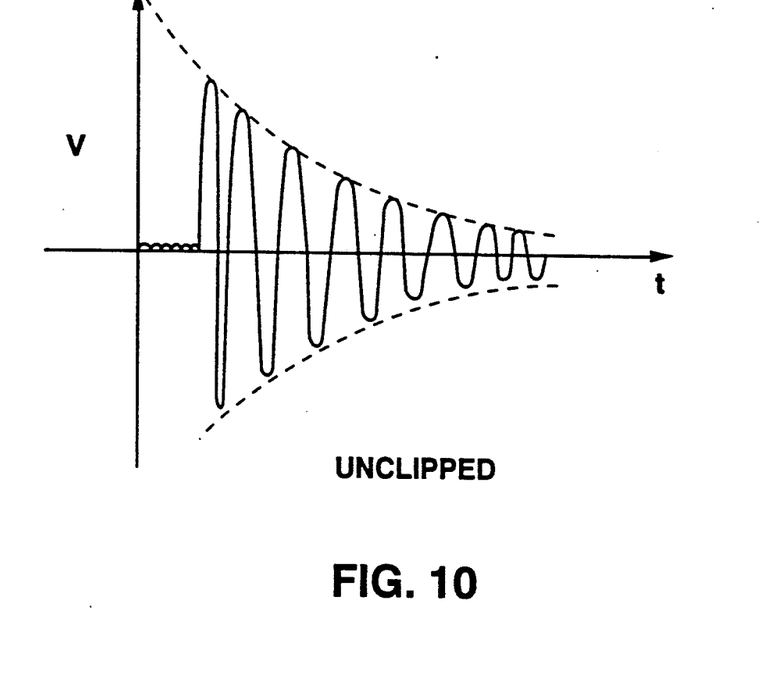
FIG. 10 is a graph showing decaying voltage versus time signals under unclipped conditions.
Figure 11:
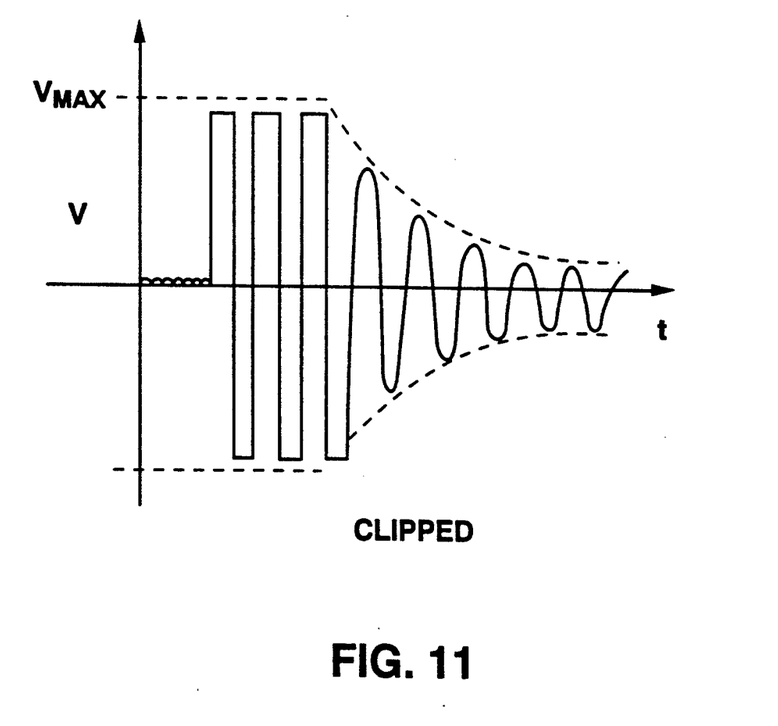
FIG. 11 is a graph showing decaying voltage versus time signals under clipped conditions.

Among potential problems which may be encountered in practicing some embodiments of the present invention is one involving signal clipping. Clipping of the acceleration signal will result when the input or output signal level of an amplifier is higher than the specified maximum allowable input or output signal for linear operation of the amplifier. Under the desired unclipped conditions, the output level will appear as shown in FIG. 10. When the amplifier is overloaded, the output level will appear as shown in FIG. 11. Clipping is an undesirable condition because it often results in a measured reverberation time that is shorter than the actual reverberation time. Inasmuch as the loss factor is inversely related to the reverberation time, a reverberation time that is shorter than the actual reverberation time will result in a measured loss factor that is higher than the true loss factor. To detect and avoid clipping, it is essential to monitor the output of the pre-amplifier at all times on an oscilloscope. The pre-amplifier gain should be set for a typical signal level such that clipping does not occur. This amplifier level should not be changed throughout the loss factor measurement. To adjust gains, only the post amplifier gain sould be varied. The acceleration signal should be monitored on an oscilloscope throughout the loss factor measurement procedure to check for clipping.

If the digital RTM program does not run properly this may be attributable to lack of response of an interfaced device to the computer. Under such circumstances aspects such as power supply to the device, correctness of address settings, and interface cable connections should be checked. It is noted that a device using dip switch address settings should be turned off before changing the address. If the oscilloscope does not respond to the command to dump data so that the data pass to the computer, a procedure may be prescribed for allowing the oscilloscope to respond to the dump data commands. If the plot routine does not work properly, one should check that the cues which the computer gives at the beginning of the plot routine regarding paper loading and setting, which are important for proper execution of the plot routine, are being followed closely. For best results the type of paper which should be used is that with which the plot routine was designed to be used. If the power is off or the computer interface cable is not connected, and the plot routine has already been called, in some embodiments the program will freeze. This external plotter problem may be remedied by a check and/or key press procedure in terms of power, address, cable, etc., so that the current data to be plotted is retained and the plotter begin plotting data.

Damping measurements made using the digital system of the present invention and the analog system were compared and found to be in good agreement. It has been shown that measurements of structural loss factor for a simple beam with contrained layer damping using the analog system agree well with theory. The analog RTM system has been used extensively for performing structural acoustics experiments. As a means of assessing the accuracy of this invention's digital RTM system, the loss factors of two structures were measured using both RTM systems. Since structural acoustics experiments may require that a wide range of reverberation time values be measured to determine loss factors, a relatively undamped structure and a highly damped structure were used as specimens. With regard to both the damped structure and the undamped structure, the loss factors measured by both RTM systems were in good agreement with each other. Thus, the present invention's digital RTM system and the analog RTM system provide comparable results and may be used interchangeably with confidence.

Moreover, several aforediscussed advantages of the present invention are manifest. Using the present invention, damping measurements are less labor-intensive and less prone to human error due to computer control of plotting, data storage/tabulation, and ⅓ octave band selection. The damping measurement process may be accomplished in less time and with greater efficiency. Loss factor data files are easily stored and recalled.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. Apparatus for measuring reverberation time in a resonant physical system having a resonant response, comprising:

a vibration transducer for converting said resonant response of said resonant physical system into an electronic signal;

a pre-amplifier, connected to said vibration transducer, for amplifying said electronic signal and producing a pre-amplified signal;

a controllable band-pass filter, connected to said pre-amplifier, for filtering said pre-amplified signal and producing a filtered signal;

a post-amplifier, connected to said band-pass filter, for amplifying said filtered signal and producing a post-amplified signal;

a waveform digitizer, connected to said post-amplifier, for digitizing said post-amplified signal and producing a digitized signal which is represented as a listing of numbers in a digital file; and means for data processing said digitized signal to determine, based on the slope of the line defined by a graphical plotting of a data file in which the base ten logarithm of the absolute value is taken for each said number in said digital file, said reverberation time in said resonant physical system.

2. A method for measuring reverberation time in a resonant physical system having a resonant response, comprising:

converting said resonant response of said resonant physical system into an electronic signal, using a vibration transducer;

amplifying said electronic signal and producing a pre-amplified signal, using a pre-amplifier which is connected to said vibration transducer;

filtering said pre-amplified signal and producing a filtered signal, using a controllable band-pass filter which is connected to said pre-amplifier;

amplifying said filtered signal and producing a post-amplified signal, using a post-amplifier which is connected to said band-pass filter;

digitizing said post-amplified signal and producing a digitized signal which is represented as a listing of numbers in a digital file, using a waveform digitizer which is connected to said post-amplifier; and data processing said digitized signal to determine, based on the slope of the line defined by a graphical plotting of a data file in which the base ten logarithm of the absolute value is taken for each said number in said digital file, said reverberation time in said resonant physical system.

* * * * *